April 22, 1969    R. S. SOLOFF ET AL    3,440,117
METHOD OF SIMULTANEOUSLY SECURING A PLURALITY OF ELEMENTS
TO A THERMOPLASTIC MEMBER USING SONIC ENERGY
Filed July 2, 1965    Sheet 1 of 2
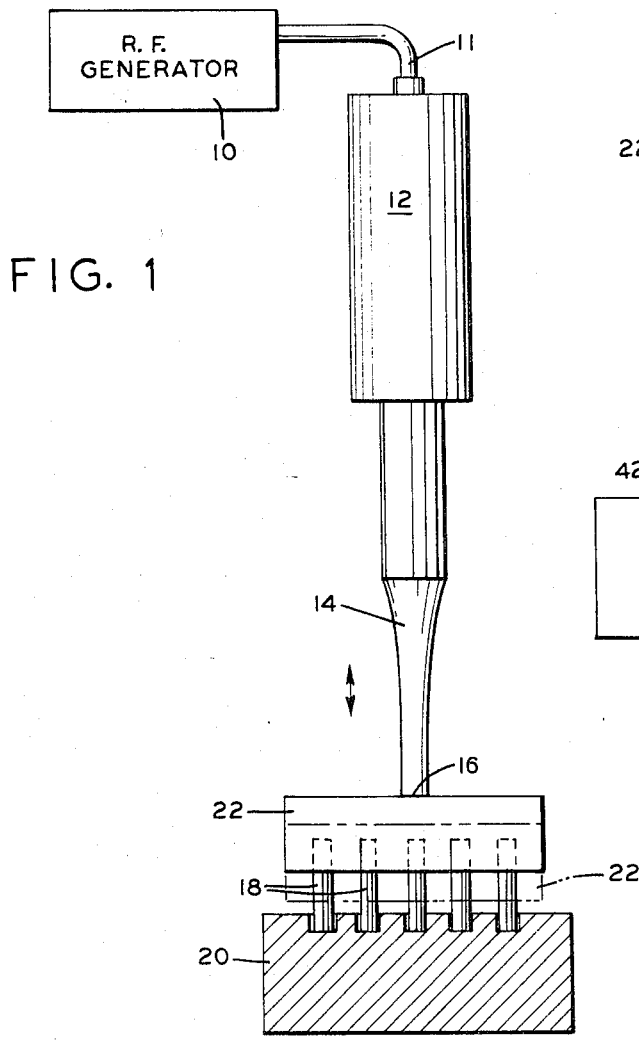
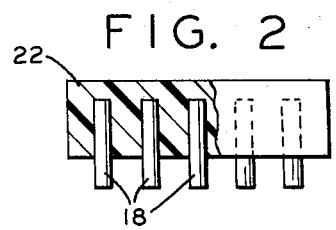
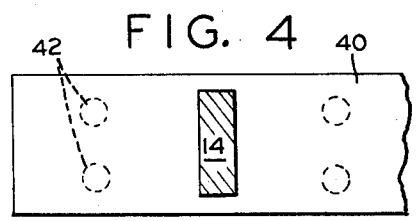
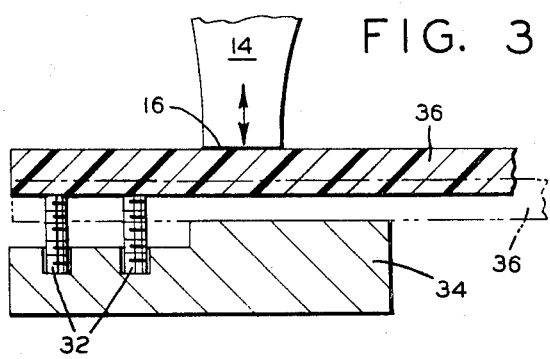
ROBERT S. SOLOFF
STANLEY E. JACKE
PETER K. BLOCH
  *INVENTORS.*
BY Ervin B. Steinberg April 22, 1969   R. S. SOLOFF ET AL   3,440,117
METHOD OF SIMULTANEOUSLY SECURING A PLURALITY OF ELEMENTS
TO A THERMOPLASTIC MEMBER USING SONIC ENERGY
Filed July 2, 1965   Sheet 2 of 2
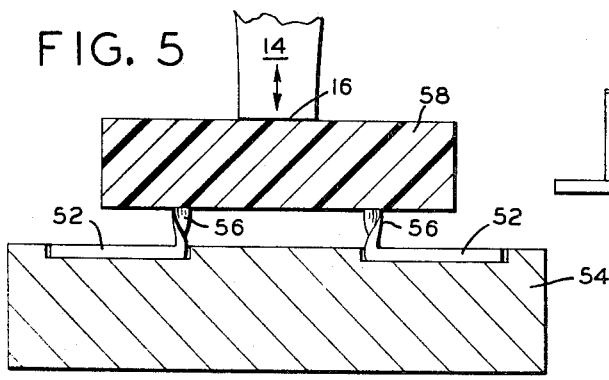
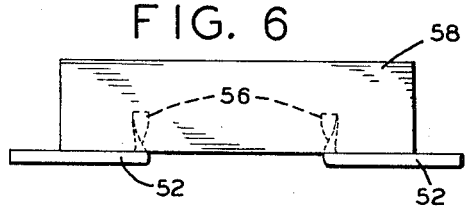
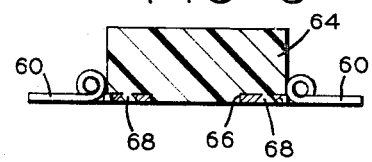
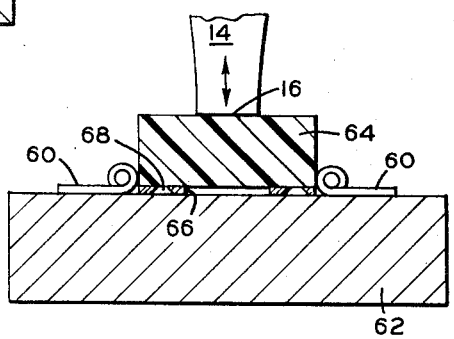
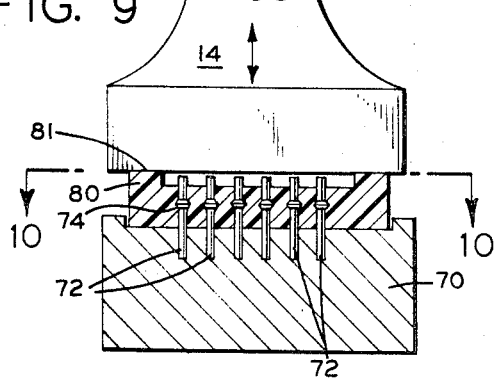
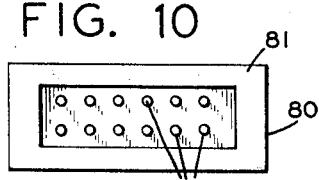
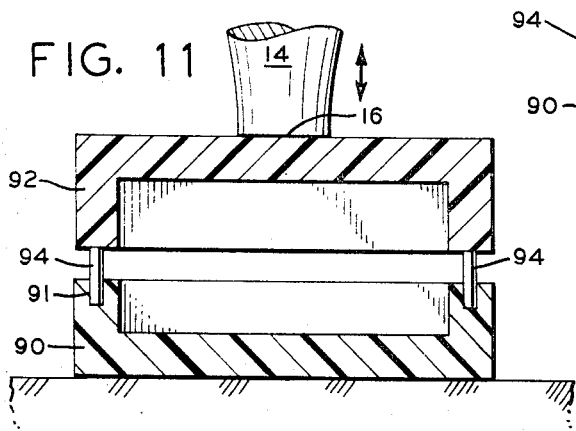
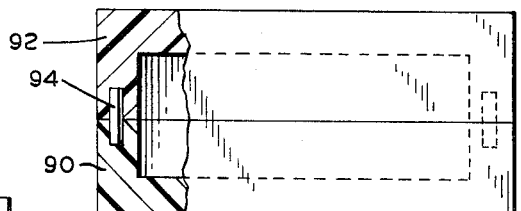
ROBERT S. SOLOFF
STANLEY E. JACKE
PETER K. BLOCH
          INVENTORS.
BY
Ervin B. Steinberg United States Patent Office 3,440,117
Patented Apr. 22, 1969

3,440,117
METHOD OF SIMULTANEOUSLY SECURING A PLURALITY OF ELEMENTS TO A THERMOPLASTIC MEMBER USING SONIC ENERGY
Robert S. Soloff, Stamford, Stanley E. Jacke, Ridgefield, and Peter K. Bloch, Old Greenwich, Conn., assignors to Branson Instruments, Incorporated, Stamford, Conn., a corporation of Delaware
Filed July 2, 1965, Ser. No. 469,182
Int. Cl. B27b 7/02; B32b 1/06, 1/10
U.S. Cl. 156—73
7 Claims

ABSTRACT OF THE DISCLOSURE

Elements, such as metal pins and the like, are secured in a thermoplastic member by applying sonic or ultrasonic energy to the thermoplastic member while urging such member and elements in contact with each other. Responsive to the dissipation of sonic energy at the area of contact between the respective elements and the thermoplastic member, the member softens, thus permitting the elements to penetrate into the thermoplastic member. By providing a fixture which holds a plurality of elements, several elements can be secured simultaneously in the thermoplastic member.

This invention, generally, refers to a method and arrangement for securing an element to a member. More particularly, the invention concerns the fastening of an element to a thermoplastic member, the element having a higher softening temperature than the thermoplastic material, and such fastening process being accomplished with the aid of sonic energy.

In the application for United States Letters Patent Ser. No. 328,500, filed on Dec. 6, 1963, in the names of Robert S. Soloff et al., entitled "Sonics," now U.S. Patent No. 3,224,916, dated Dec. 21, 1965, a method has been disclosed for sealing together two thermoplastic parts by transmitting sonic energy through one part to the interface between the two thermoplastic parts, the sonic energy causing a softening of the common interface whereby the parts join in, what appears to be, a fusion weld. While the precise process by which this sealing is accomplished is not completely understood, it is believed that the sonic energy dissipated at the interface causes frictional heat and produces, moreover, energy losses by the repetitive high frequency impact of one part upon the other, both phenomena producing a softening and working of the plastic material at the interface so that a localized flowing of the thermoplastic material occurs to provide the seal. This process has found wide commercial application and is practiced extensively.

It has been found now that when sonic energy is applied to a thermoplastic material which is in contact with a part having a higher softening or melting temperature than the thermoplastic material, the sonic energy again causes a softening of the interface between such part and the thermoplastic member so that those materials can be joined, specifically the element having the higher softening temperature can be fastened to the thermoplastic member quickly and inexpensively. This process is particularly suited for the insertion of pins and other fastening elements in a thermoplastic block, for fastening structural members together, and for many other applications which more clearly will be described and illustrated in the following description.

One of the principal objects of this invention is, therefore, the provision of a new and novel method for securing an element to a thermoplastic member.

Another object of this invention is the provision of a method for securing an element to a thermoplastic member by the use of sonic energy, said element having a higher softening temperature than the thermoplastic member.

Another object of this invention is a method and arrangement for simultaneously securing a plurality of individual elements to a thermoplastic member using sonic energy.

A further object of this invention is the provision of securing a plurality of metallic elements or elements having a relatively high softening temperature to a thermoplastic body using sonic energy, the method being characterized by speed and extreme simplicity, requiring little skill and part preparation.

A still further and other object of this invention is the provision of a method and arrangement for securing together two structural members, at least one of which is of thermoplastic material, by one or more fastening elements and the use of sonic energy applied to one of the members and conducted by such member to the interface between this member and the fastening element.

Further and still other objects of this invention will be more clearly apparent by reference to the following description when taken in conjunction with the accompanying drawings, in which:

FIGURE 1 is a schematic representation of the arrangement for inserting a plurality of fastening elements into a plastic body;

FIGURE 2 is a sectional view of the plastic body of FIGURE 1 after the insertion of the elements has been accomplished;

FIGURE 3 is a vertical sectional view of an alternative embodiment of the present invention;

FIGURE 4 is a top plan view of a further alternative embodiment;

FIGURE 5 is a vertical sectional view of a further example of the present method and arrangement;

FIGURE 6 is a view similar to FIGURE 5 showing the thermoplastic member with the elements inserted;

FIGURE 7 is a view of a still further example of the present method;

FIGURE 8 is a view similar to FIGURE 7 showing the completed assembly;

FIGURE 9 is a vertical view, partly in section, of the present method used for producing a multicontact electrical connector;

FIGURE 10 is a plan view of the completed connector;

FIGURE 11 shows a variation of the disclosed method, illustrating the fastening together of two structural members, one of which is a thermoplastic material, and FIGURE 12 is a view similar to FIGURE 11, showing the two members secured to one another.

Referring now to the figures and FIGURE 1 in particular, there is shown a radio frequency generator 10 which provides via a conductor 11 alternating current energy at about 20 kilocycles per second to a sonic converter unit 12. The converter is fitted with a horn 14 for transferring sonic energy to a workpiece. The sonic converter 12, generally, is a device which converts electrical energy to mechanical vibrations and, to this end, includes one or more piezoelectric disks which vibrate under the influence of alternating current electrical energy. The vibrations are amplified and appear as longitudinal vibrations at the tip 16 of the horn 14. The converter illustrated here is a relatively small, hand supportable device and is available commercially under the trademark "Sonifier," model J–17 or model J–32, from Branson Instruments, Incorporated, Sonic Power Division, Danbury, Conn. It is substantially the same unit as used for the sealing of thermoplastic parts disclosed in the patent application stated heretofore. The sonic converter provides approximately 150 watts of acoustic energy, the power delivered being somewhat dependent upon the impedance of the load to which the tip 16 of the horn 14 is coupled. The horn may be designed as a tapered horn, an exponential horn, a stepped horn, a conical horn, or be of such other configuration as is well known and understood by those skilled in the art. The tip 16 is shaped to follow the contour of the workpiece to which it is applied and may be of round or rectangular cross section, solid or tubular, depending upon the particular requirements.

As seen in FIGURE 1, a plurality of pins 18 is held in a fixture 20, made for instance of steel or aluminum. A thermoplastic block, numeral 22, for instance styrene, rests on top of the pins 18. Upon energizing the sonic converter 12 and applying relatively light engagement pressure between the tip 16 of the horn and the block 22, thereby urging the thermoplastic block 22 against the pins 18, the sonic energy causes a very localized softening of the block at the respective interfaces with the pins 18 so that the pins under the influence of the engagement force are driven into the block. The remainder of the thermoplastic member 22 remains substantially cool and unaffected. When a predetermined penetration of the pins 18 in the material 22 has been reached, the sonic converter 12 is removed, thereby removing simultaneously the engagement force, and the thermoplastic material hardens about the pins 18 to provide a finished assembly as shown quite clearly in FIGURE 2.

A plurality of pins 18 can be inserted into the thermoplastic body 22 in a matter of seconds. The softening of the thermoplastic material is confined to the interface between the pins and the thermoplastic material and it is believed that this softening is caused by localized frictional losses as well as the dissipation of the high frequency kinetic energy imparted by the horn 14. The elements 18 may be made of metal, wood or other plastic or thermoplastic material. For instance, nylon inserts have been inserted into acrylic material. The only requirement appears to be that the inserted element have a higher softening temperature than the base into which the element is inserted so that the base material "flows" around the element. No predrilling is required although beneficial effects have been noted when providing a small pilot hole. Such holes have been found particularly effective when driving plastic elements.

A variation of the setup shown in FIGURES 1 and 2 is illustrated in FIGURE 3 wherein a set of threaded studs 32 is held in a fixture 34. The tip 16 of the sonic converter horn 14 engages a thermoplastic sheet 36 and, as should be noted, the horn is applied at a point remote from the interface between the threaded studs 32 and the sheet 36. The sonic energy is conducted from the horn 16 to the sheet 36 and is conducted by the sheet to this interface, causing the softening of the thermoplastic material at this interface and thus, permitting the studs to penetrate into the sheet 36. The threads serve as anchoring means since the plastic, when soft, flows around the threads and subsequently hardens in the thread turns. The finished assembly is indicated by the dashed lines. As stated before, this insertion can be carried out without predrilling of the plastic member 36. The studs 32 may be metal, wood, nylon, or other material whose softening point is at a temperature above that of the thermoplastic sheet 36.

A somewhat similar arrangement is shown in FIGURE 4 which shows a plastic member 40 and a set of four pins 42, the pins being arranged in a rectangle. When applying sonic energy by means of the horn 14 at a location disposed between the pins 42, such as shown, the energy is conducted by the plastic member to the interface with the pins and all four pins are driven simultaneously into the plastic member 40. It may be noted further, that the sonic energy from the horn 40 will be conducted in the sheet 36 along several axes and planes.

FIGURE 5 shows a further arrangement and depicts two L-shaped metal members 52 retained in a fixture 54. Each of the metal members 52 is provided with a twisted portion 56 along its upstanding leg to provide anchoring means for the respective element in the thermoplastic body 58. The finished assembly is shown in FIGURE 6.

FIGURE 7 illustrates, for exemplary purposes, a set of hinges 60 which are disposed in a metallic fixture 62. When the horn 14 is pressed into contact with the thermoplastic body 64 and sonic energy is transferred, the plastic body softens at the interfaces with the hinges and flows around the inner surface 66 of the hinge plate as well as into the hole 68 of the hinge plate. Thus, the hinge is recessed into the plastic body 64 and, if the hole 68 is countersunk, the hinge will be secured in place. The finished construction is seen more clearly in FIGURE 8.

A very convenient way of manufacturing a multicontact electrical connector is shown in FIGURES 9 and 10. A plurality of metallic connector pins 72 is supported in a fixture 70. Each pin 72 is provided with an annular rim 74 which serves to anchor the respective pin in the plastic connector body. Upon applying the horn 14 to the raised rim 81 of the plastic connector body 80, the plastic body is forced toward the stationary fixture 70, causing the pins 72 to sink into the plastic body 80.

FIGURES 11 and 12 illustrate the fastening together of two members, at least one of which is made from thermoplastic material. A set of pins 94 is disposed in blind holes 91 of a body member 90. When sonic energy is applied via the horn 14 to the thermoplastic body member 92, the interface between the pins 94 and the member 92 is softened, causing the plastic member 92 to close upon the member 90 as seen in FIGURE 12. The member 90 may be of any suitable material, plastic, metal, wood or otherwise. Alternatively, the pins 94 may form an integral part of the body 90.

Further tests have shown that elements can be inserted into a thermoplastic member when there is a substantial difference between the axis of longitudinal vibrations along which the sonic energy is applied to the member and the axis along which the element penetrates into such member. For instance, when applying the tip 16 of the vibrating horn 14 to a first surface of a thermoplastic member, an element can be inserted into a second surface of such member along an axis normal to the second surface, although this second surface is disposed at 90 degrees to said first surface. Therefore, the axis along which such element is inserted, is disposed at 90 degrees to the axis of the longitudial vibrations of the horn. Separate force means need to be applied to the element to urge it into the member.

While the above described process can be carried out quite suitably at a frequency of 20 kilocycles per second, sonic energy at a higher or a lower frequency may be used without materially affecting the results obtained at 20 kilocycles. The sonic generator described hereinabove is of a convenient size and the noise produced is substantially inaudible, a condition which does not prevail when the frequency is lowered to 16 kilocycles or below. It is for this reason that frequencies above 16 kilocycles have been accepted and found most convenient for carrying out the operations which employ sonic energy.

What is claimed is:

1. A method for securing simultaneously a plurality of elements to a thermoplastic member, said elements having a higher softening temperature than said member, comprising the steps of:

(a) supporting said plurality of elements in a fixxture;

(b) urging said elements and member into contact with one another;

(c) applying sonic energy to said thermoplastic member while said elements are in contact with said member, said energy causing said thermoplastic member to soften at the areas of contact with said elements, whereby to enable said elements to penetrate into said member, and (d) removing said sonic energy when a predetermined penetration of said elements in said member has been reached whereby said thermoplastic member hardens around said elements.

2. A method for securing simultaneously a plurality of elements to a thermoplastic member as set forth in claim 1 wherein each of the elements is provided with anchoring means for securing each member in the thermoplastic member.

3. A method for securing simultaneously a plurality of elements to a thermoplastic member as set forth in claim 1 wherein said elements are metallic.

4. A method for securing simultaneously a plurality of elements to a thermoplastic member as set forth in claim 1 wherein said sonic energy is produced by an electromechanical converter having a horn providing longitudinal vibrations along its axis, and said horn is brought in contact with said thermoplastic member to transmit sonic energy thereto.

5. A method for securing simultaneously a plurality of elements to a thermoplastic member as set forth in claim 4 wherein said horn engages said member along a longitudinal axis which is offset with respect to the axis of motion along which some of said elements penetrate into said member.

6. A method for securing simultaneously a plurality of individual elements to a thermoplastic member, each of said elements having a higher softening temperature than said member, comprising the steps of:

(a) supporting said plurality of elements in a fixture;

(b) operating an electromechanical transducer so as to create at an output end thereof longitudinal vibratory energy in the sonic to ultrasonic frequency range;

(c) pressing the output end of said transducer in the direction parallel to the vibrations against one surface of said thermoplastic member while the opposite surface of said member is disposed against said plurality of elements so that the vibratory energy transmitted through said member causes said thermoplastic member to soften and to flow at the areas of its contact with each of said elements whereby to permit penetration of each of said elements into the thermoplastic member, and (d) removing said output end from contact with said thermoplastic member upon the penetration of said elements into said member to a predetermined extent whereupon said thermoplastic member hardens at the areas of contact with said elements and retains said elements.

7. A method for securing two strucutral bodies to one another, one of said bodies being of thermoplastic material, comprising the steps of:

(a) disposing a set of fastening elements having a higher softening temperature than said thermoplastic body between said bodies;

(b) operating an electromechanical transducer so as to create longitudinal vibratory energy in the sonic to ultrasonic frequency range at an output end thereof;

(c) pressing the output end of said transducer in the direction parallel to said vibrations against one surface of one of said bodies while said bodies are urged toward one another with said elements interposed therebetween whereby said vibratory energy transmitted through said one body causes said thermoplastic body to soften and to flow at the areas of its contact with said elements, thus permitting penetration of said elements into said thermoplastic body, and (d) removing said output end from contact with said body upon the penetration of said elements into said body to a predetermined extent whereupon said thermoplastic body hardens at said areas of contact with said elements.

References Cited

UNITED STATES PATENTS

| 3,184,353 | 5/1965 | Balamuth et al. | 156—73 |
| 3,224,916 | 12/1965 | Soloff et al. | 156—73 |

PHILIP DIER, *Primary Examiner.*

U.S. Cl. X.R.

29—470.3; 156—92 303.1, 306; 264—23, 277